(12) United States Patent
Yang

(10) Patent No.: US 6,662,943 B1
(45) Date of Patent: Dec. 16, 2003

(54) DISK CASE

(76) Inventor: Yuan Tang Yang, P.O. Box 26-757, Taipei 106 (TW)

( * ) Notice: Subject to any disclaimer, the term of this patent is extended or adjusted under 35 U.S.C. 154(b) by 0 days.

(21) Appl. No.: 10/189,841

(22) Filed: Jul. 4, 2002

(51) Int. Cl.[7] .............................................. B65D 85/57
(52) U.S. Cl. ..................................... 206/308.1; 206/310
(58) Field of Search ...................... 206/308.1, 309–312, 206/493; 220/324, 326

(56) References Cited

U.S. PATENT DOCUMENTS

| | | | | |
|---|---|---|---|---|
| 2,600,087 A | * | 6/1952 | Vogel | 220/324 |
| 3,670,875 A | * | 6/1972 | Jones | 220/324 |
| 5,713,463 A | * | 2/1998 | Lakoski et al. | 206/308.1 |
| 6,021,894 A | * | 2/2000 | Lakoski et al. | 206/308.1 |
| 6,170,658 B1 | * | 1/2001 | Dering | 206/308.1 |
| 6,216,862 B1 | * | 4/2001 | Chang | 206/308.1 |
| 6,227,363 B1 | * | 5/2001 | Lu | 206/308.1 |
| 6,298,986 B1 | * | 10/2001 | Chang | 206/310 |
| 6,409,014 B1 | * | 6/2002 | Hummell et al. | 206/308.1 |

FOREIGN PATENT DOCUMENTS

WO   WO 88/06559   *   9/1988   .............. 206/308.1

* cited by examiner

Primary Examiner—Luan K. Bui
(74) Attorney, Agent, or Firm—Rosenberg, Klein & Lee

(57) ABSTRACT

An improved disk case includes a top case and a bottom case. The top case has a first protrusion defining an inner through hole. The bottom case is pivotally connected to the top case. An engagement structure is located on the bottom case to match the through hole when the bottom case comes into contact with the top case. The engagement structure has a hollow cylindrical portion, a top plate on the hollow cylindrical portion, and a second protrusion around the top plate. The top case and the bottom case are fastened together by engaging the second protrusion with the first protrusion.

8 Claims, 7 Drawing Sheets

DISK CASE

BACKGROUND OF THE INVENTION

1. Field of the Invention

The invention relates to an improved disk case. More specifically, the invention relates to a thinner disk case for holding a compact disk (CD).

2. Description of the Prior Art

Referring to FIG. 1, a schematic view of a conventional disk case is shown. The conventional disk case 3a includes a top case 1a and a bottom case 2a. A first surface of the top case 1a is provided with two side plates 11a respectively at two opposite edge thereof. One edge of the bottom case 2a is pivotally connected to one side of the top case 1a, which is perpendicular to the side plates 11a, such that the top case 1a and the bottom case 2a can match each other when they are closed together. On a first surface of the bottom case 2a, which faces the first surface of the top case 1a, there is a space 22a for holding CD. In the central area of the bottom case 2a is disposed an engagement member 21a consisting of a plurality of protrusions spaced equally around the center point of the bottom case 2a.

However, the conventional disk case 3a has disadvantages such as large thickness in use. Therefore, there is a need for a disk case with reduced thickness.

SUMMARY OF THE INVENTION

It is therefore a principal object of the invention to provide an improved disk case with reduced thickness and increased convenience.

To provide a further understanding of the invention, the following detailed description illustrates embodiments and examples of the invention, this detailed description being provided only for illustration of the invention.

A disk case has a top case having a first protrusion defining an inner through hole; and a bottom case being pivotally connected to the top case, such that a first surface of the bottom case faces a first surface of the top case when the bottom case is pushed toward the top case, the bottom case having an engagement structure located thereon and protruded from the first surface thereof to match the through hole when the bottom case comes into contact with the top case, wherein the engagement structure has a second protrusion; whereby, the top case and the bottom case are fastened together by engaging the second protrusion with the first protrusion.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
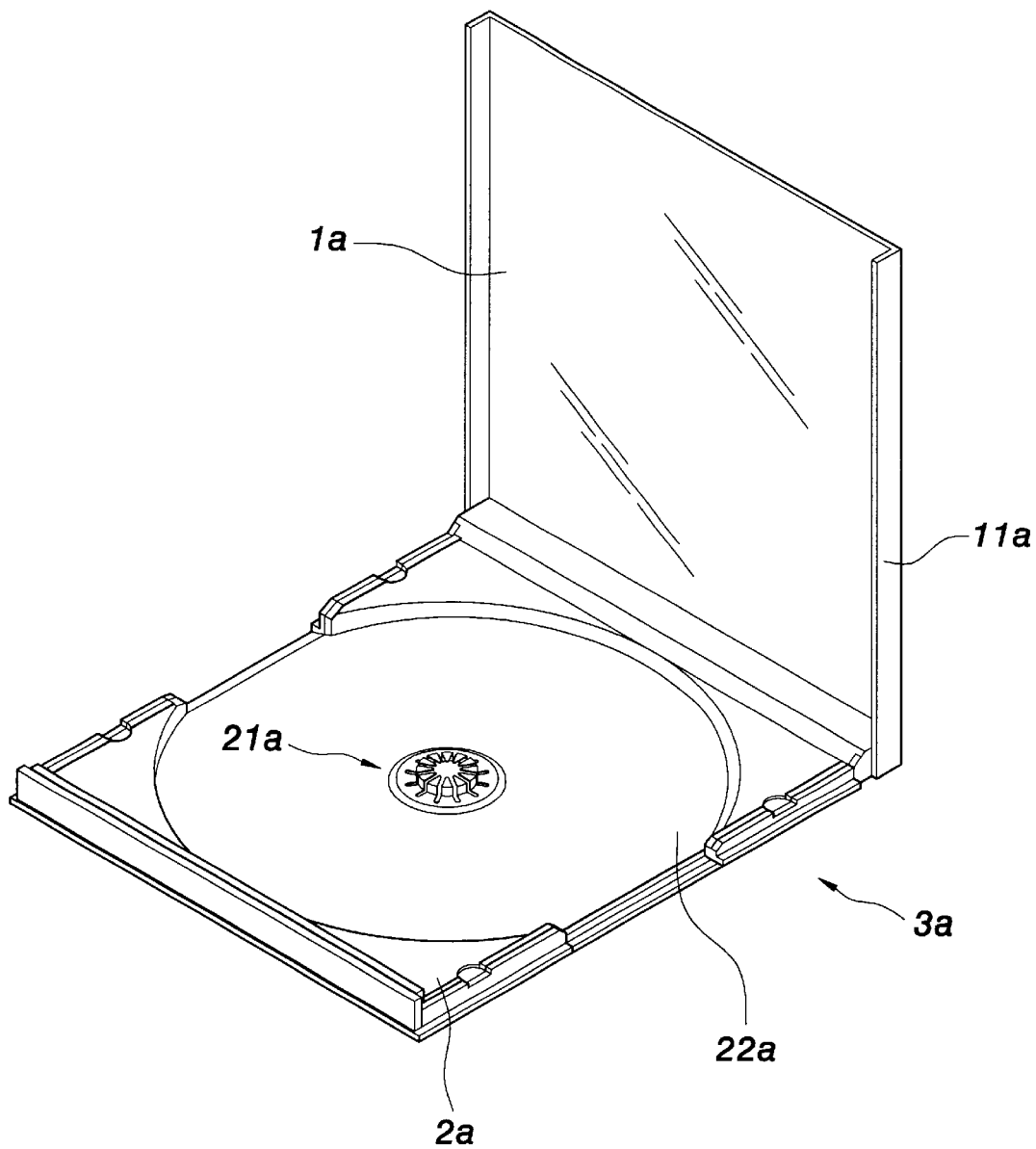
FIG. 1 is a schematic view of a conventional disk case.

Wherever possible in the following description, like reference numerals will refer to like elements and parts unless otherwise illustrated.

Figure 2:
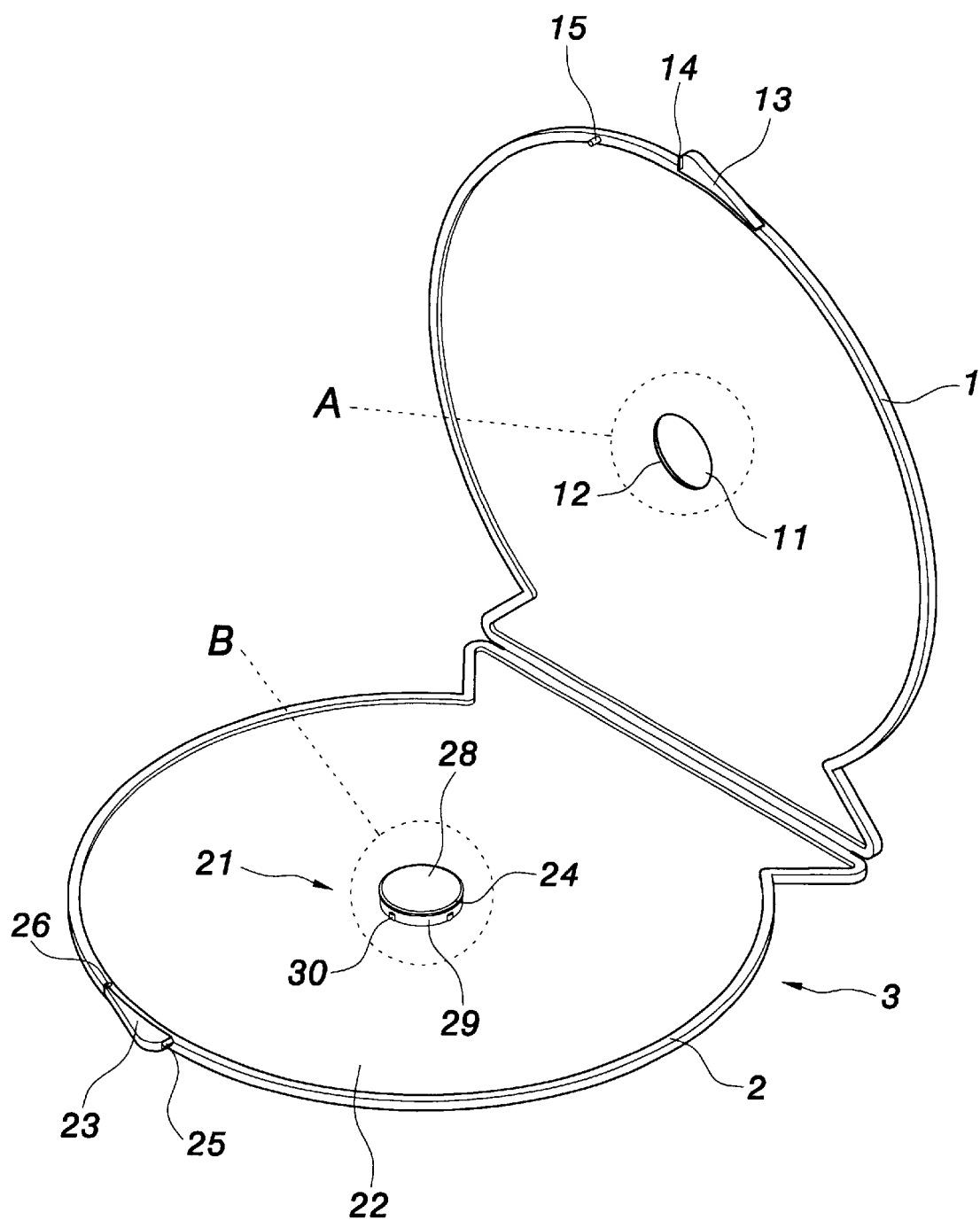
FIG. 2 is a schematic perspective view of a disk case according to one preferred embodiment of the invention.
Figure 2A:
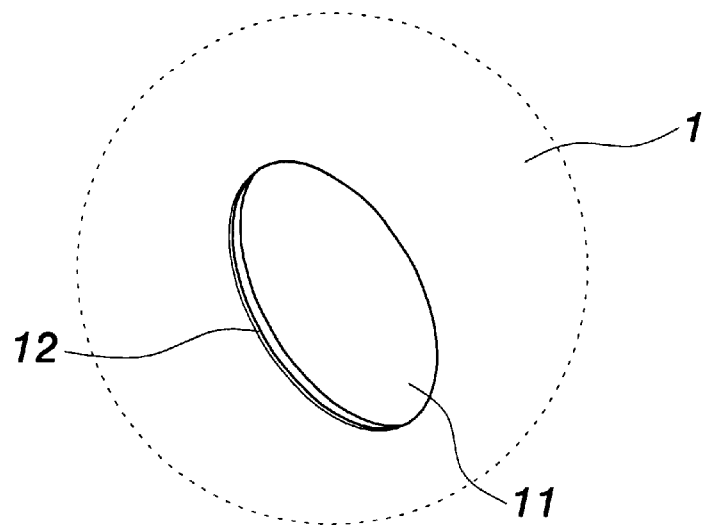
FIG. 2A is a partially enlarged view of portion A of FIG. 2.
Figure 2B:
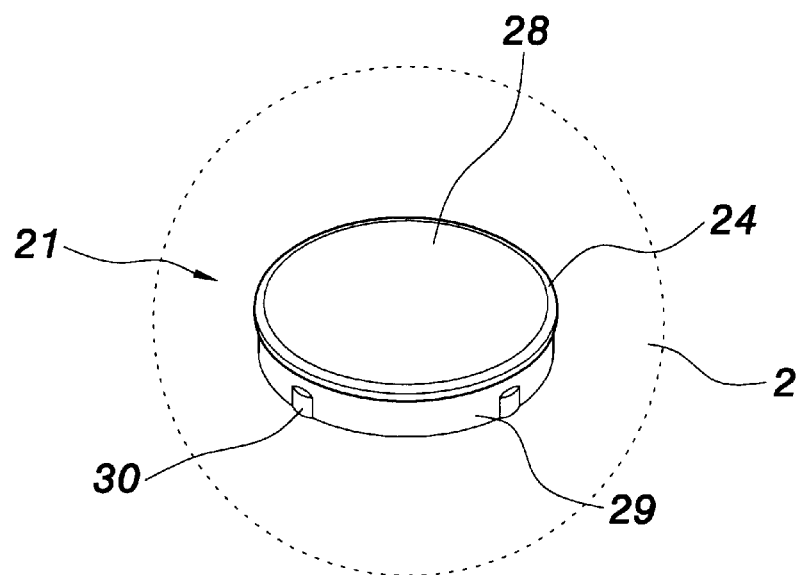
FIG. 2B is a partially enlarged view of portion B of FIG. 2.
Figure 3:
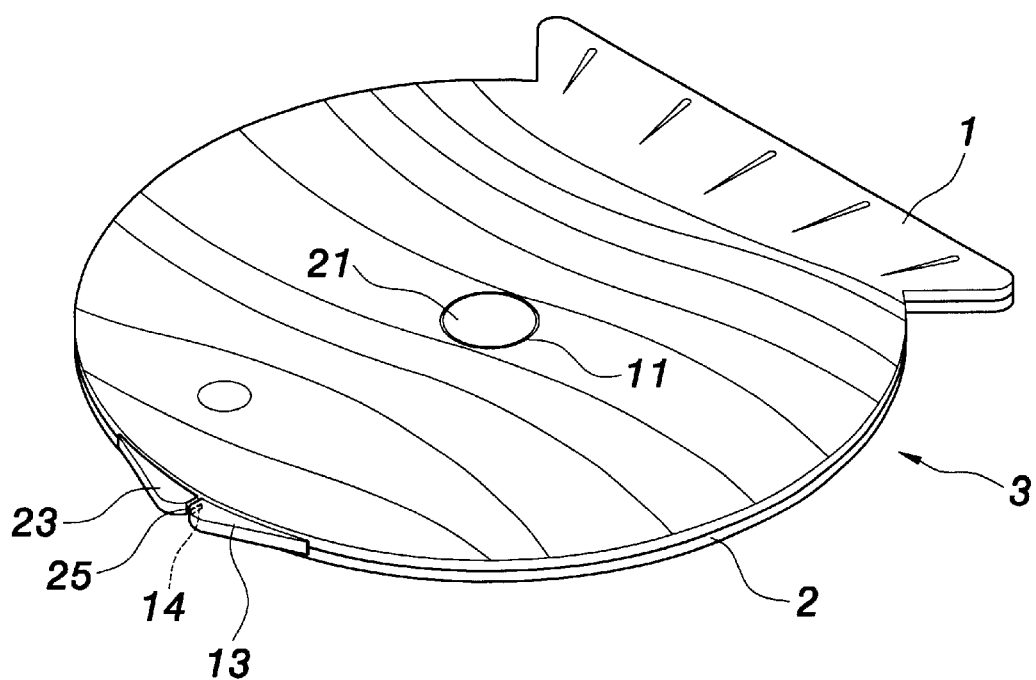
FIG. 3 is schematic view showing the top case and the bottom case closed onto each other according to one preferred embodiment of the invention.

Referring now to FIGS. 2–3, the disk case of the invention includes a top case 1 and a bottom case 2. The top case 1 has a first protrusion 12 in which is defined a through hole 11 at an appropriate position. An upper engagement part 13 having an upper buckle 14 is located at one side of the top case 1. A pin 15 is located on the same side of the top case as the upper engagement part 13 and near the upper engagement part 13.

Figure 5:
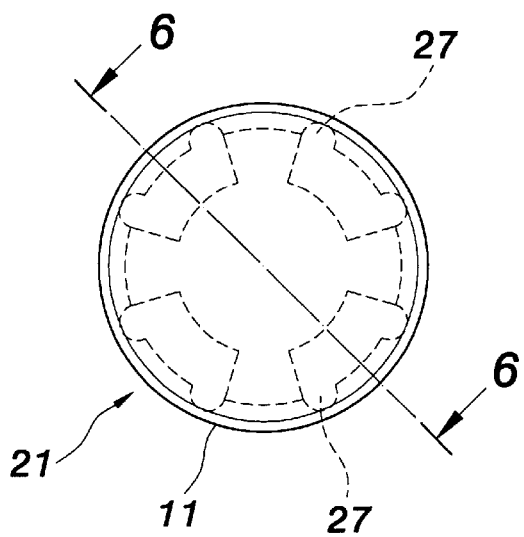
FIG. 5 is a schematic, cross-sectional view of a disk case in an engagement structure according to one preferred embodiment of the invention.
Figure 7:
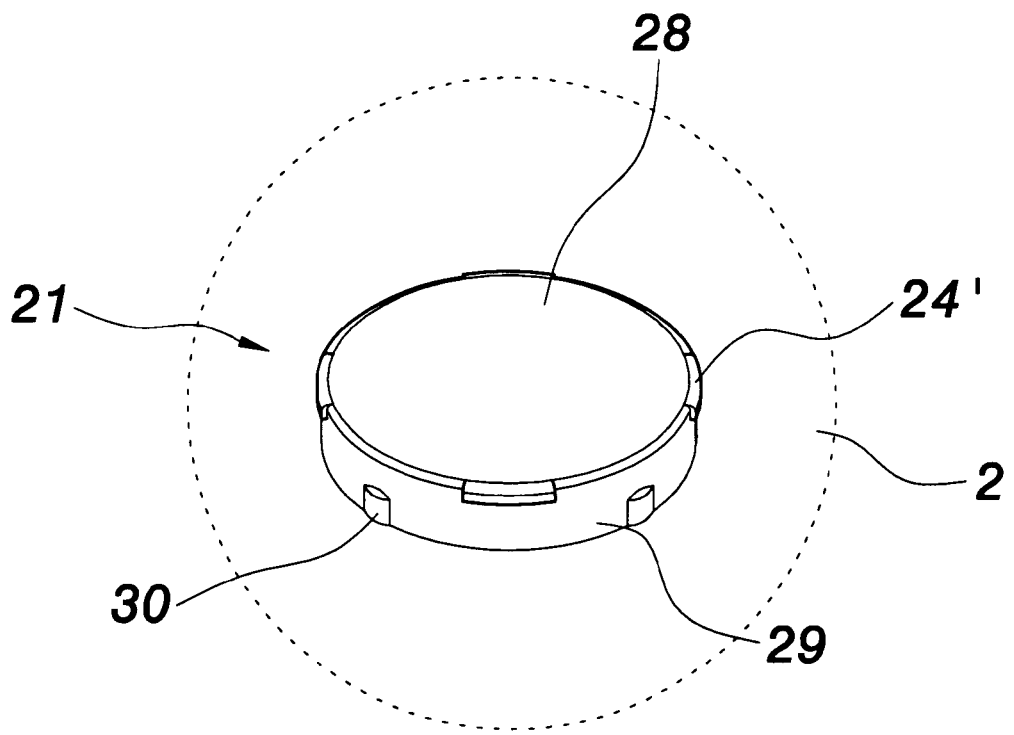
FIG. 7 is a schematic view of a disk case in an engagement structure according to another embodiment of the invention.

The bottom case 2 is pivotally connected to the top case 1 so that a first surface of the bottom case 2 faces a first surface of the top case 1 when the bottom case 2 is pushed toward the top case 1. An engagement structure 21 is located on and protruded from the first surface to match the through hole 11 when the bottom case 2 comes into contact with the top case 1. The engagement structure 21 is a hollow cylindrical portion 29 with a top plate 28 thereon. A second protrusion 24 is located around the top plate 28 to fit the first protrusion 12. The second protrusion 24 is a protruding ring. A plurality of indentations 27 are located spacially inside the hollow cylindrical portion 29, as shown in FIG. 5. The hollow cylindrical portion 29 has a plurality of support ribs 30, as shown in FIG. 7. A concave region 22 is formed around the engagement element 21. At one side of the bottom case 2 is provided a lower engagement part 23 matching the upper engagement part 13. The lower engagement part 23 has a lower buckle 25. A pin receiver 26 is located on the same side of the bottom case 2 as the lower engagement part 23 and near the lower engagement part 23. The pin receiver 26 receives the pin 15 when the top case 1 and the bottom case 2 are closed together.

Figure 4:
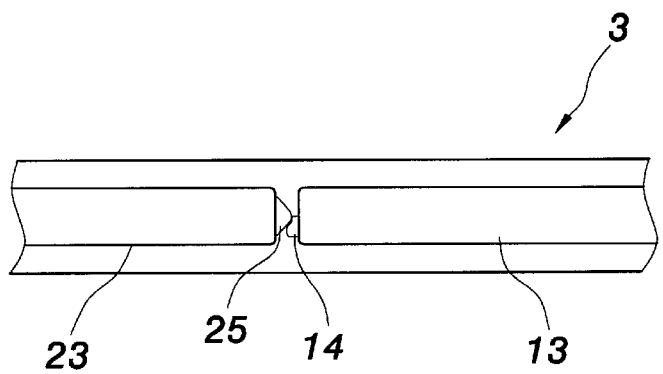
FIG. 4 is a schematic view showing an engagement of the upper engagement part with the lower engagement part according to one preferred embodiment of the invention.

With the above structure of the invention, when the top case 1 and the bottom case 2 are closed together, the engagement structure 21 passes through the through hole 11. The second protrusion 24 matches the first protrusion 12. The upper buckle 14 of the upper engagement part 13 engages with the lower buckle 25 of the lower engagement element 23, as shown in FIG. 4. Thereby, the top case 1 is fixedly fastened to the bottom case 2 to achieve a disk case 3 which is more compact and has an improved engagement. Furthermore, the pin 15 penetrates and matches the pin receiver 26 to increase the engagement between the upper engagement part 13 and the lower engagement part 23, thus increasing the reliability of the disk case 3. The disk case 3 is opened by twisting the upper engagement part 13 and the lower engagement part 23.

Figure 6:
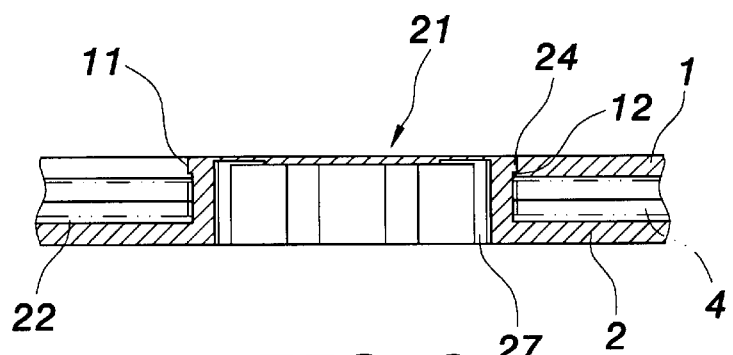
FIG. 6 is a cross sectional view of FIG. 5 taken along section 6—6.

With reference to FIGS. 5 and 6, the CD 4 is placed into the concave region 22. The CD 4 is pushed onto the engagement structure 21 at the hollow cylindrical portion 29 to inwardly compress the indentations 27. Thereby the CD 4 is fixed to the engagement structure 21 inside the disk case 3.

With reference to FIG. 7, is a schematic view of a disk case in an engagement structure according to another embodiment of the invention. A plurality of flanges are formed with the second protrusion 24'.

Figure 8:
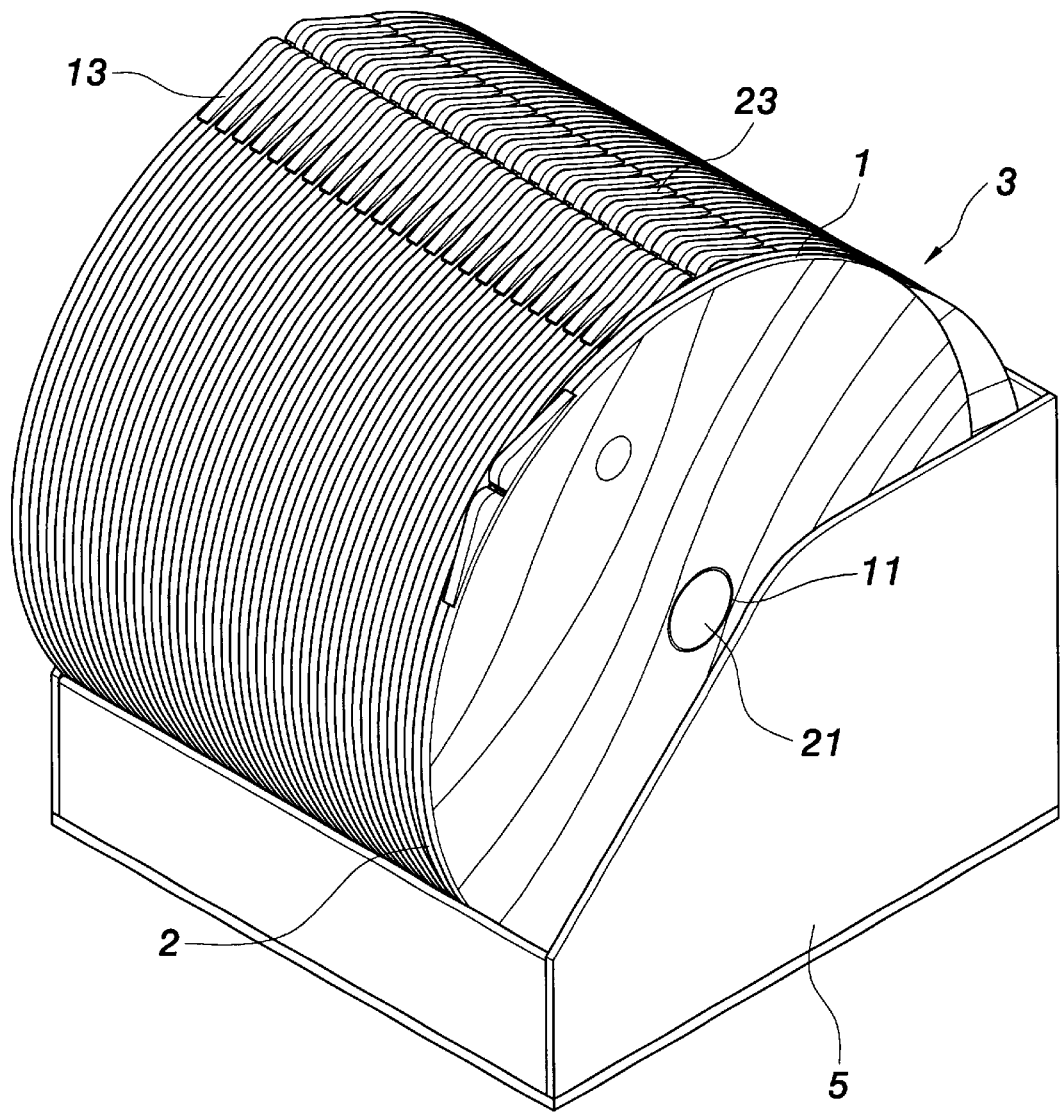
FIG. 8 is schematic view showing a disk case arranged in a CD collection box according to one preferred embodiment of the invention.

With reference to FIG. 8, a schematic view of a plurality of the disk cases of the invention arranged in a CD collection box is shown. The disk case 3 of the invention has a reduced thickness so that more collection space is saved compared to the prior art and thus more disk cases 3 can be placed into the CD collection box 5.

In view of foregoing, the invention has advantages over the prior art such as:

(1) the disk case has a reduced thickness and improved engagement;
(2) the disk case is more convenient in use;
(3) the disk case has improved performance in holding the CD.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A disk case, comprising:
   a top case having a first protrusion defining an inner through hole; and
   a bottom case pivotally connected to the top case such that a first surface of the bottom case faces a first surface of the top case when the bottom case is pushed toward the top case, the bottom case having an engagement structure located thereon and protruded from the first surface thereof to match the through hole when the bottom case comes into contact with the top case, wherein the engagement structure has a second protrusion, the engagement structure being a hollow cylindrical portion having a top plate, and the second protrusion is disposed around the top plate, the hollow cylindrical portion having a plurality of indentations formed therein;
   whereby, the top case and the bottom case are fastened together by engaging the second protrusion with the first protrusion.

2. The disk case of claim 1, further comprising an upper engagement located on one side of the top case, and the upper engagement including an upper buckle.

3. The disk case of claim 2, further comprising a lower engagement located on one side of the bottom case, and a lower buckle located on one end of the lower engagement, wherein the lower engagement corresponds to the upper engagement.

4. The disk case of claim 1, wherein a pin is disposed on a side of the top case, and a pin receiver corresponds to the pin and is disposed on a side of the bottom case.

5. The disk case of claim 1, wherein a plurality of support ribs are located on the hollow cylindrical portion and a connecting place of the bottom case.

6. The disk case of claim 1, wherein the second protrusion is a protrusion ring.

7. The disk case of claim 1, wherein a plurality of flanges are formed with the second protrusion.

8. The disk case of claim 1, wherein the bottom case has a concave region which is around the engagement structure.

* * * * *